United States Patent
Cowham et al.

(10) Patent No.: US 8,549,239 B2
(45) Date of Patent: Oct. 1, 2013

(54) NETWORK MESSAGE LOGGING AND ARCHIVAL

(75) Inventors: Adrian W. Cowham, Roseville, CA (US); Daniel E. Ford, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1443 days.

(21) Appl. No.: 11/820,806

(22) Filed: Jun. 20, 2007

(65) Prior Publication Data
US 2008/0320257 A1 Dec. 25, 2008

(51) Int. Cl.
*G06F 12/00* (2006.01)
(52) U.S. Cl.
USPC .......................... 711/161; 711/162
(58) Field of Classification Search
USPC ................ 711/161; 713/150–181, 187–188; 717/174–178
See application file for complete search history.

(56) References Cited

U.S. PATENT DOCUMENTS

| 6,732,125 | B1 * | 5/2004 | Autrey et al. | 707/204 |
| 7,107,418 | B2 * | 9/2006 | Ohran | 711/161 |
| 7,117,294 | B1 * | 10/2006 | Mi et al. | 711/101 |
| 7,512,862 | B1 * | 3/2009 | Taylor | 714/755 |

FOREIGN PATENT DOCUMENTS
WO  WO 03081433 A1 * 10/2003

OTHER PUBLICATIONS

Racz, B. and Lukacs, A., High density compression of log files, Mar. 23-25, 2004, IEEE, Proceedings of the Data Compression Conference (DCC 2004), pp. 557.*

* cited by examiner

*Primary Examiner* — Manorama Padmanabhan
*Assistant Examiner* — Baboucarr Faal

(57) ABSTRACT

A method includes receiving a message to be logged. In response to receiving the message, the message is written to a stream corresponding to an active archive. The active archive includes compressed messages. Also in response to receiving the message, the message is written to an active log without compression.

18 Claims, 7 Drawing Sheets

NETWORK MESSAGE LOGGING AND ARCHIVAL

BACKGROUND

Electronic systems such as computers frequently support automatic recordation of events in the form of a message log in order to provide an audit trail for diagnosing problems or monitoring events. When such systems are networked, the number, size, and variety of messages may cause the log to consume storage space rapidly. In order to reduce the amount of storage space required, the log may be stored in archive form. Archives are compressed for storage purposes. Ideally, the user should be able to readily monitor current or recent events and have access to a lengthy history of messages recorded in the archived log.

One approach for archiving messages utilizes a database. Although the database may facilitate data mining and extensive analysis of messages, database archival adds another layer of complexity when users merely want to review recent events.

Another approach logs events in an uncompressed active log. Although the uncompressed active log is readily viewable, the user must manually create an archive when the active log becomes too lengthy. Thus in order to efficiently preserve a history of events, the user must initiate the archival process manually. Aside from the manual archival, this ad hoc approach can result in inadvertent consumption of large amounts of storage unless the user diligently monitors the size of the log.

Yet another approach initiates automatic archival at periodic intervals. This approach can be problematic as well. If the interval is too short, then performance may suffer. If the interval is too long, then excessive amounts of storage space may be consumed in the interim. The unpredictable nature of network activity complicates selection of an archiving interval that keeps the length of the log manageable without archiving too frequently.

SUMMARY

Various methods and apparatus for logging and archiving messages are described. In one embodiment, a method includes receiving a message to be logged. The message is written to a stream corresponding to an active archive, wherein the active archive comprises compressed messages. The message is also written to an active log without compression.

In another embodiment, an apparatus includes a process and a nonvolatile memory. Upon receipt of a message to be logged the processor writes the message to an uncompressed active log stored by the nonvolatile memory. The processor also writes the message to a stream corresponding to an active archive stored by the nonvolatile memory. The message is compressed within the active archive.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
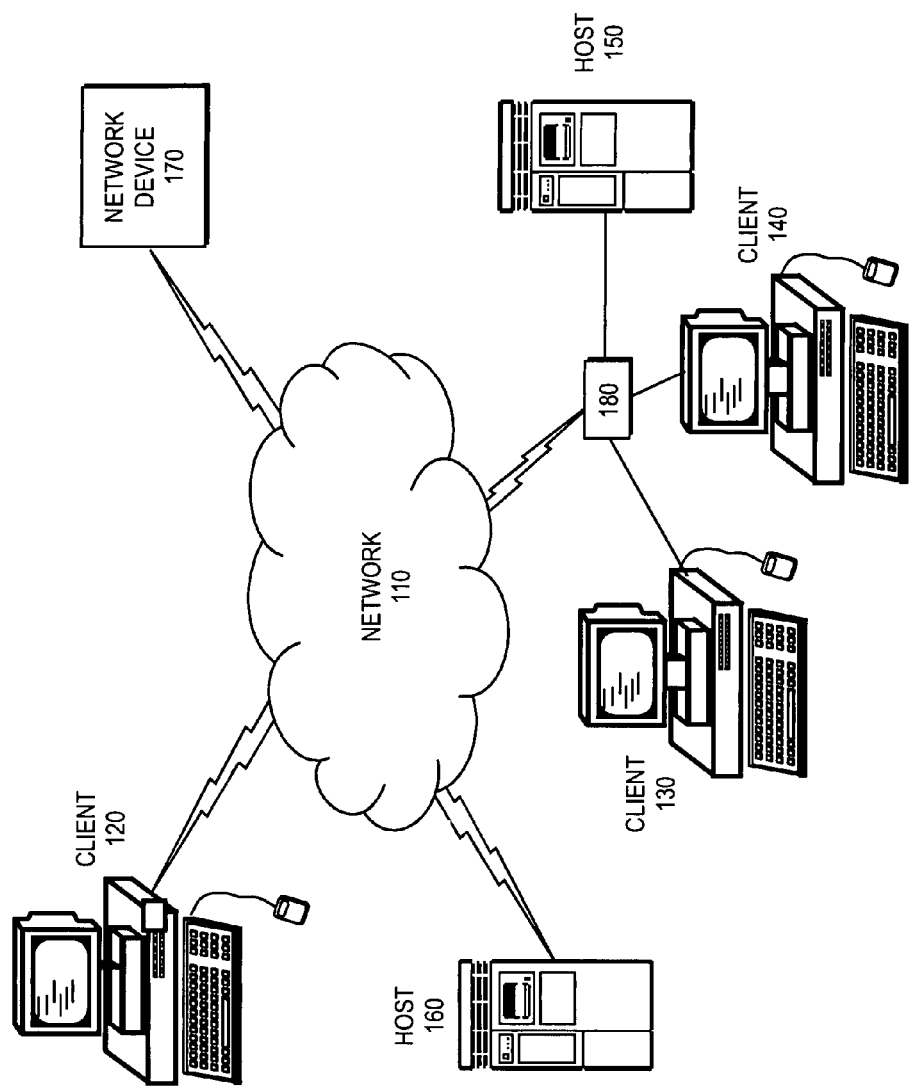
FIG. 1 illustrates one embodiment of a network.

FIG. 1 illustrates a network environment including a communication network 110 communicatively coupling a plurality of network devices 170. Although the network may be an "intranet" designed primarily for access between computers within a private network, in one embodiment network 110 is the network commonly referred to as the Internet. The Internet includes a combination of routers, switches, hubs, repeaters, gateways, bridges, and communications links with computers spread throughout the world. The Internet facilitates communication between computers or other devices connected to the Internet. Despite the variety in functionality, these devices may all be generically referred to as network devices 170.

Some of the computers are referred to as host computers because they provide services upon request. The computers issuing the requests are referred to as client computers. The network environment of FIG. 1 includes multiple (N) client computers (120, 130, 140) and multiple (M) host computers (150, 160). In some cases, a plurality of computers (e.g., 130, 140, 150) may reside on a common network that shares a common connection (e.g., via router 180) to the Internet.

The host computers (e.g., 150) and client computers (e.g., 120) can be entirely different architectures, however, to facilitate communication on network 110 they communicate by using a common communication protocol. In one embodiment, this protocol is the Transmission Control Protocol/Internet Protocol (TCP/IP).

Many of these network devices have the capability of reporting activity or status in the form of messages. These messages may be maintained locally on the device or communicated to another device such as a computer. The message content and scope of detail may vary greatly.

The messages may be vital to diagnosing the system as well as planning modifications or simply proactively monitoring the security of the system (i.e., management and audit). Indeed standard protocols (e.g., syslog) have been developed to support forwarding these messages on an Internet Protocol network. Standard protocols such as syslog permit the collection of messages from many different types of network devices into a common central repository on the network.

Figure 2:
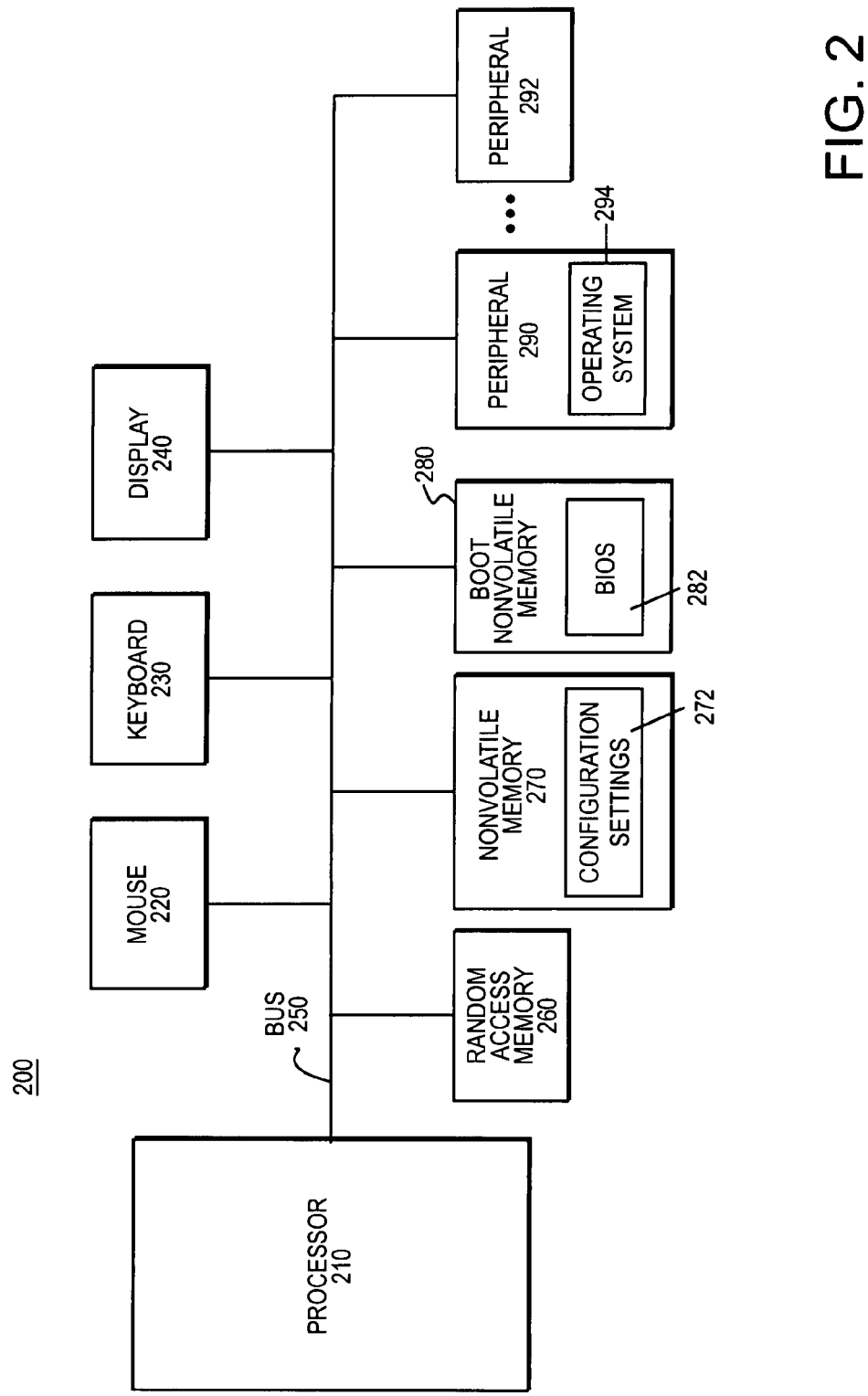
FIG. 2 illustrates one embodiment of an archiving apparatus.

The central repository may be a computer coupled to the network. FIG. 2 illustrates one embodiment of a computer system architecture. The computer system need not necessarily have all of the illustrated components in order to function as a repository for logging or archiving messages.

Computer 200 includes processor 210. Input devices such as mouse 220 and keyboard 230 permit the user to input data to client computer 200. Information generated by the processor is provided to an output device such as display 240. Computer 100 includes random access memory (RAM) 260 used by the processor during program execution.

RAM 260 is typically a volatile memory and does not retain its contents once power is removed from the computer system. Computer 200 includes nonvolatile memory 270 for storing configuration settings 272 even when the computer is powered down. Often parameter information that identifies specific features of the input/output devices is stored in nonvolatile memory 270. For example, parameter information might describe the number of disk drives, disk drive type, number of heads, tracks, amount of system RAM, etc. as well as the sequence in which peripherals are accessed when attempting to boot the computer (peripheral boot sequence). Typically, nonvolatile memory 270 is a semiconductor-based memory. Various types of nonvolatile media including electrically erasable programmable read only memory (EEPROM), flash electrically re-writable memory, and battery-backed complementary metal oxide semiconductor (CMOS) are available.

Although occasionally referred to as a boot read only memory (ROM), the boot nonvolatile memory 280 is typically embodied at least partially as a re-writable nonvolatile memory to permit updates. The boot nonvolatile memory may include routines for communicating with input/output devices in the computer system. In some computer systems these routines are collectively referred to as the Basic Input Output System (BIOS) 282. The BIOS provides a common interface so that software executing on the processor can communicate with input/output devices such as the keyboard, mouse, nonvolatile mass memory storage device, and other peripheral devices. The boot ROM nonvolatile memory 280 and the parameter nonvolatile memory 270 need not be distinct memories.

Mouse 220, keyboard 230, display 240, RAM 260, nonvolatile memory 270, and boot nonvolatile memory 280 are communicatively coupled to processor 210 through one or more buses such as bus 250.

The computer also has one or more peripherals 290 such as a floppy drive, a hard drive, or an optical drive that supports nonvolatile storage. Typically the operating system 294 is stored in nonvolatile memory. Compact disks (CDs) and Digital Video Disks (DVDs) are examples of media used with optical drives. Other peripherals may be provided. For example, peripheral 292 may function as a network interface to enable the computer to interface and communicate on the network of FIG. 1.

The processor executes instructions that may be collectively stored in nonvolatile memory as one or more programs. The computer, for example, may execute a syslog program to perform the function of logging messages received from various network devices including itself. Various methods for archiving messages and reconstructing these archives that may be performed by a computer are disclosed.

Figure 3:
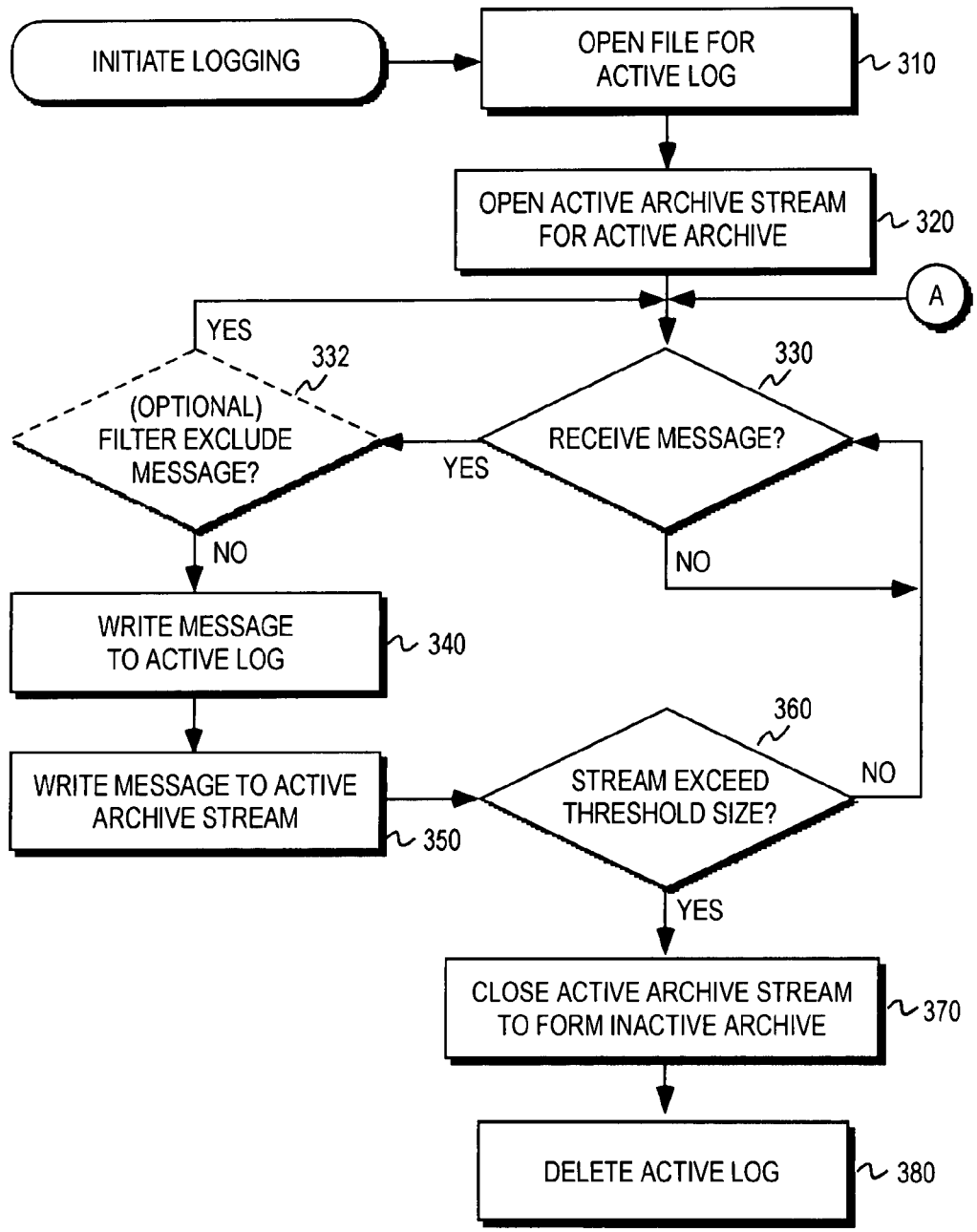
FIG. 3 illustrates one embodiment of a method of logging and archiving messages.

FIG. 3 illustrates one embodiment of a method of logging messages. Upon initiation of logging, a file for an active log is opened in step 310. An active archive stream is opened for the active archive 320. The logging process waits until a message is received as determined by step 330.

In one embodiment every event message received is logged. Optionally, however, a filter may be applied as indicated in step 332, to exclude classes of messages. For examples, messages from specific devices or applications may be ignored. Messages may be ignored based upon a priority, severity, or warning code associated with the message. If the filter excludes the message, then processing returns to step 330 until receipt of a subsequent message. Rather than an explicit filter in the process, filtration may occur outside of the process such that only messages of the desired type are sent to the process. Multiple instances of the process of FIG. 3 may be executed to generate archives and logs for different types of messages, if desired.

If no filter is implemented (or does not exclude the received message), then processing continues with step 340 to write the message to an active log. In one embodiment, the active log is an uncompressed file such as a human-readable text file.

The message is also written to the active archive stream in step 350. Messages written to the active archive stream are compressed for storage. The file associated with the active archive stream cannot be viewed until after the stream is closed because no other process can gain access to the archive file.

In order to prevent the archive from growing beyond manageable sizes, a threshold may be established as a "cut-off". Once this threshold is reached as determined by step 360, the active archive may be finalized and migrated to an inactive archive. Accordingly, the active archive stream is closed to form the inactive archive in step 370. Typically, this entails writing header or data descriptor information related to the compression process to the stream.

The active log may be deleted in step 380. If not deleted, the active log effectively becomes an inactive log. Any new messages to be logged will be written to a new active log file and a new active archive. In the event further logging is desired, the method may be initiated again beginning with step 310. The logging method may be configured to automatically initiate whenever an active archive stream is closed or upon recovery from a catastrophic event such as a power loss.

The compression applied to the messages must be lossless. Entropy encoding and dictionary coding are general classes of lossless compression techniques. Other lossless compression techniques include run-length encoding, Burrows-Wheeler transform, prediction by partial matching, and dynamic Markov compression. Various embodiments may use any of these techniques singularly. Alternatively, one or more may be used in combination with other techniques to achieve higher compression rates or for more robust archives (i.e., de-sensitized to corruption).

Examples of entropy encoding include Huffman coding, an adaptive Huffman coding, and arithmetic coding. Some of these coding techniques may be considered as special cases of other class members depending upon compression parameters such as block size and whether the compression is conducted at a bit, byte, or word level.

Examples of dictionary encoding include Lempel-Ziv-Oberhumer (LZO), Lempel-Ziv 77 (LZ77), Lempel-Ziv 78 (LZ78), Lempel-Ziv-Markov (LZM), and Lempel-Ziv-Welsh (LZW) coding. These are well-known examples of dictionary encoding.

PKZIP (manufactured by PKWARE of Milwaukee, Wis.) is an archiving tool that incorporates lossless compression. PKWARE is the creator and maintainer of the ".ZIP" file format standard for archiving one or more files. The ".ZIP" file format is one of the most prevalent archive formats. Utilities for reading and writing ".ZIP" files may be found on most computing platforms.

The ".ZIP" file format supports multiple compression algorithms. The well-known DEFLATE program utilizes LZ77 in conjunction with Huffman coding when compressing files and was originally developed by PKWARE for the PKZIP application. In one embodiment, the resulting inactive archive is a ".ZIP" file that includes the logged messages in compressed form. The active log is a text file.

Although "archive" typically refers to a collection of files that have been combined into one, the active and inactive archives may contain a single compressed log file.

The active archive is being compressed "on-the-fly" and generally cannot be used or read by another process until it has been closed (at which time it has become an inactive archive). The active log, however, may be read by text viewers even while it is being updated. The active log includes the log data of the active archive in accessible form. The process of FIG. 3 produces an active log while creating an active archive. Thus no manual or periodic process is required to subsequently create the archive. Moreover, the contents of the archive are available via the active log during creation and from the inactive archive upon completion.

The active archive is susceptible to catastrophic corruption in case an event interrupts the archive process prior to closing the stream. For example, in order to extract any compressed files from an archive, critical information such as lengths of files, compression method, etc. must first be retrieved from the archive to guide the extraction. This information is typically the last information written to the stream. Thus interruptions prior to this point result in an unusable archive.

Figure 4:
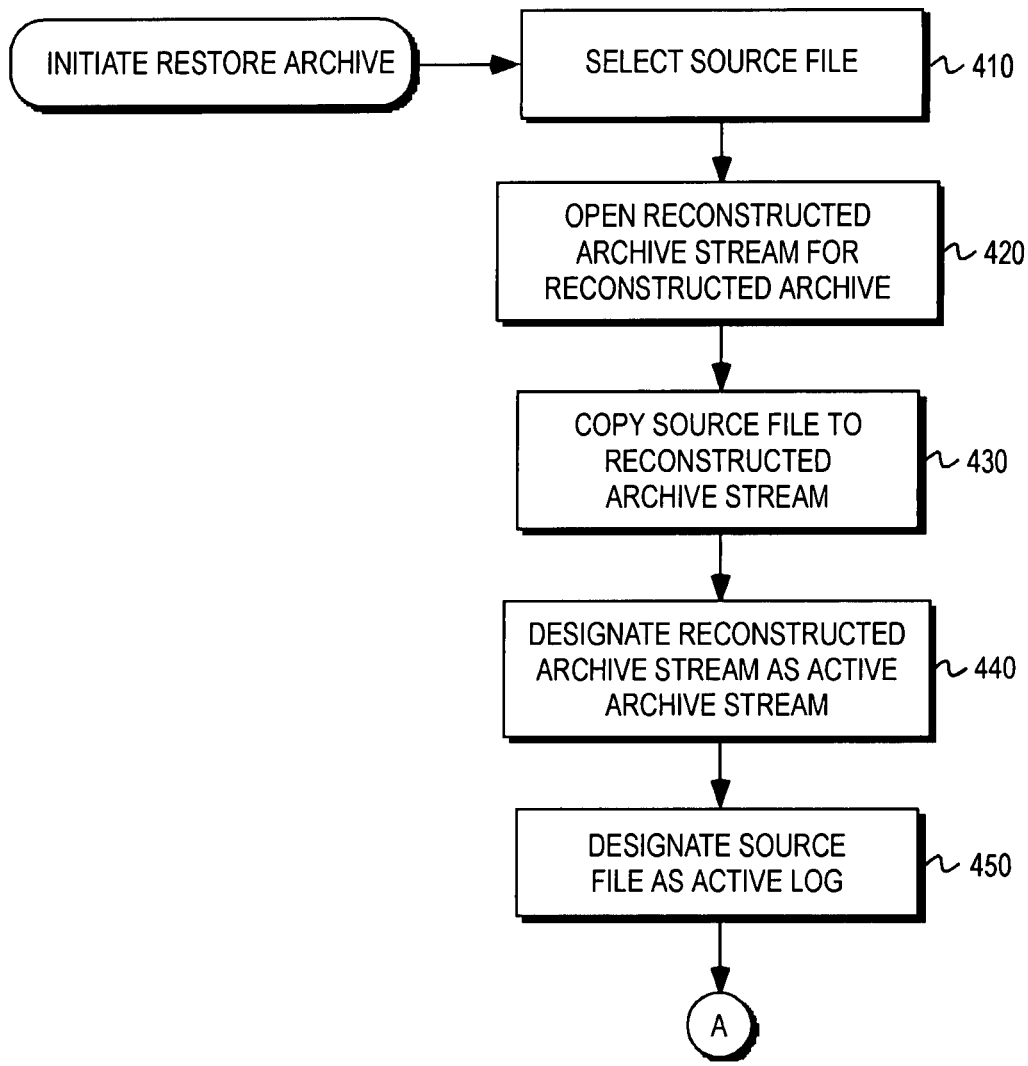
FIG. 4 illustrates one embodiment of a method for reconstructing an archive.

The existence of the active log enables reconstruction of a corresponding archive. FIG. 4 illustrates one embodiment of a process of restoring an archive in the event of corruption or loss of the original archive.

The source file for reconstruction is selected in step 410. There are a few possibilities for source file selection. In the event that message archiving is "in-process", the active log may serve as the selected source file. Alternatively, an existing inactive log may serve as the selected source file. For example, after recovering from a catastrophic event such as a power loss, there may be files corresponding to what were the active log and the active archive prior to the power loss. Upon initial recovery from the catastrophic event, any file corresponding to the former active archive would likely be corrupted beyond recovery and would at best be labeled an inactive archive. Similarly, the associated log file serving as the former "active log" would become an inactive log upon power-up. This inactive log may be suitable for reconstructing a corresponding inactive archive.

In step 420, a reconstructed archive stream is opened for the reconstructed archive. In step 430, the selected source file is copied to the reconstructed archive stream. The process of FIG. 4 anticipates a recovery that proceeds to continue with message logging. Thus the reconstructed archive stream is designated as the active archive stream in step 440. The selected source file is designated as the active log in step 450. After restoration of the active archive stream, the process may continue to step 330 of FIG. 3 and proceed with event logging.

The designation steps are provided to clarify the interaction of the process of FIG. 4 with the process of FIG. 3. In practice, the designation steps may be incorporated as part of the functionality of earlier steps. For example, the name, identifier, or handle chosen for the reconstructed archive stream (and associated target file) may effectively result in the designation of that stream as the active archive stream. Similarly, the manner in which the source file is selected may designate the source file as the active log. For example, in anticipation of writing to the source file, the source file may be initially opened with read and write access permissions rather than read-only.

Figure 5:
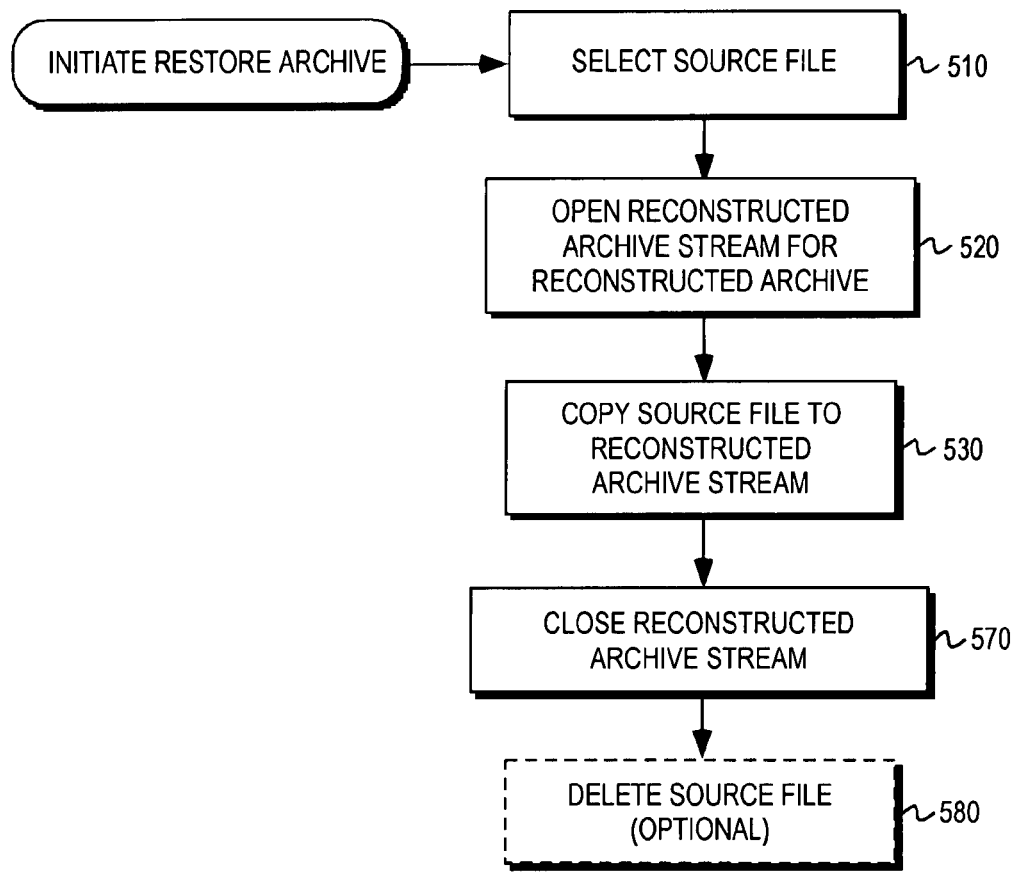
FIG. 5 illustrates one embodiment of an alternative method for reconstructing an archive.

FIG. 5 illustrates an alternative embodiment of a process of reconstructing an archive in the event the active archive is corrupted or lost. The process of FIG. 4 may be more appropriate for automated recovery and ongoing message logging. The process of FIG. 5 is more appropriate for ad-hoc recovery.

The source file for reconstruction is selected in step 510. The source file may be a file that previously served as the active log. In step 520, a reconstructed archive stream for a reconstructed archive is opened. The source file is copied to the reconstructed archive stream in step 530. The reconstructed archive stream is closed in step 540. This results in a reconstructed archive file that may be accessed by applications capable of extracting compressed files from an archive. The reconstructed archive is the inactive archive corresponding to the selected source file.

Figure 6:
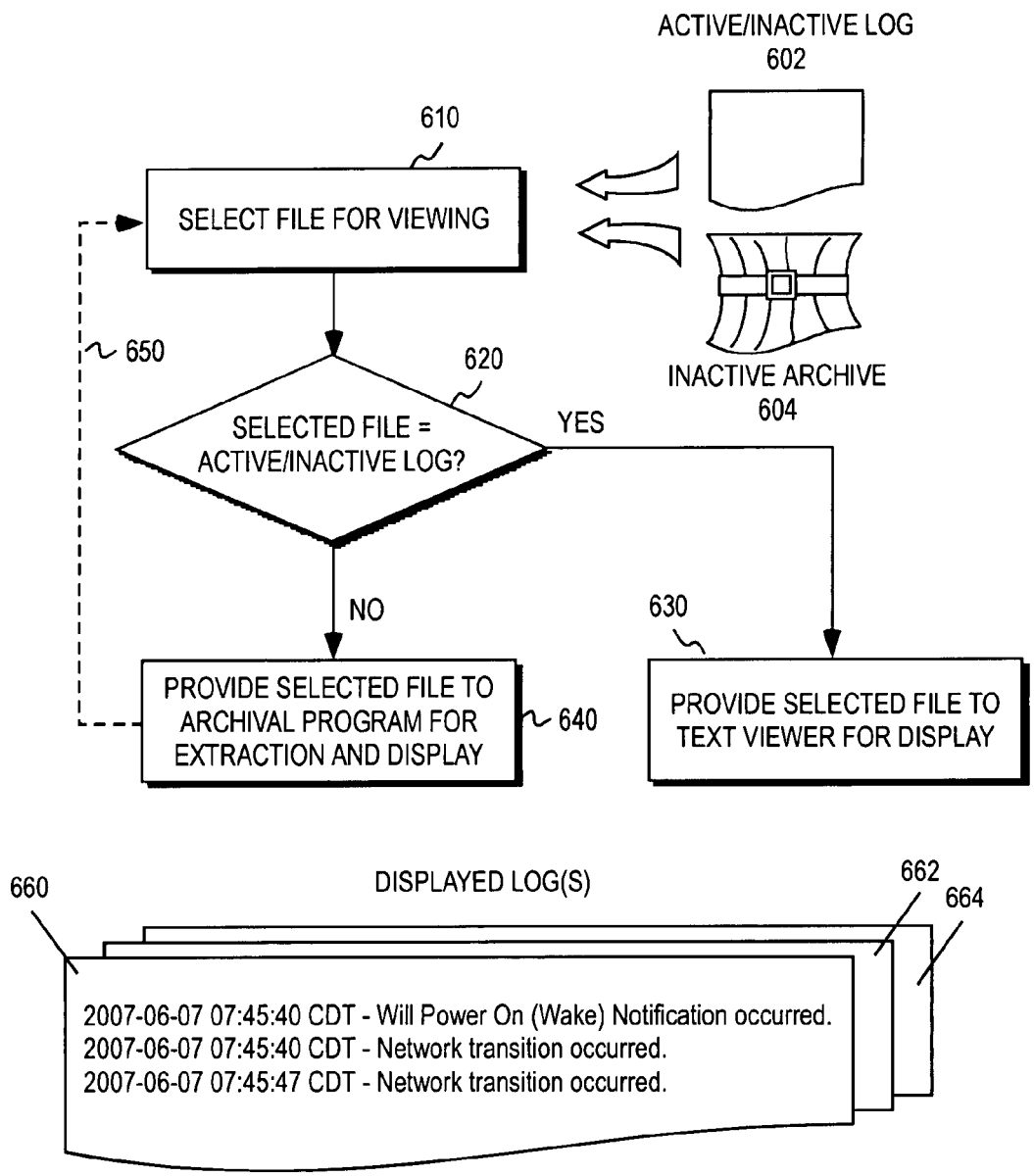
FIG. 6 illustrates viewing active/inactive log files and inactive archives.

FIG. 6 illustrates one embodiment of viewing active or inactive logs and inactive archives. A file is selected for viewing in step 610. If the selected file is an active or inactive log as determined by step 620, the selected file may be displayed using a text viewer in step 630. A text viewer is an application program that receives a text file as input and presents the file on a display such as display 240 of FIG. 2. If the selected file is an inactive archive, the selected file is provided to an archival program in step 640 to extract and display the archive contents such as the inactive log. In the event that the archival program supports extraction only, the extracted file may subsequently be selected as an inactive log and displayed using the text editor as suggested by dotted line 650.

FIG. 6 illustrates an example of displayed logs. The text viewer may display a single log 660. Alternatively, some log viewing programs may present a single log file as multiple displayed logs 660-664 based upon categorization of log entries. The archival program may similarly display a single log 660. Alternatively, the archival program may extract and display all log files 660-664 in the event that the archive includes multiple inactive log files.

Figure 7:
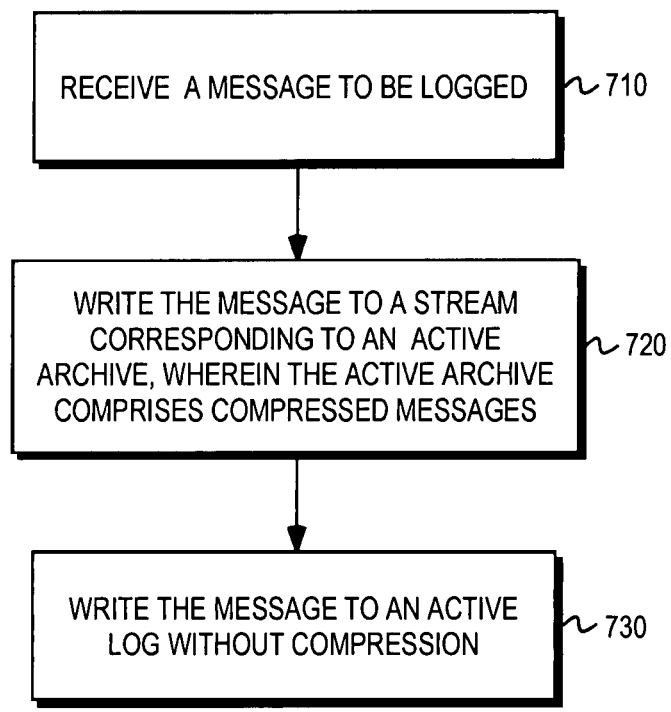
FIG. 7 illustrates another embodiment of a method of logging messages.

FIG. 7 illustrates another embodiment of a method of logging messages. In step 710, a message to be logged is received in step 710. The message is written to a stream corresponding to an active archive in step 720. The active archive comprises compressed messages. The message is written to an active log without compression in step 730.

Methods and apparatus for archiving messages are described. Writing to both an active log and an active archive avoids the need for subsequent manual or periodic archiving while enabling examination of the most recent messages. The existence of the active log (or inactive log in case of a catastrophic event) enables reconstruction of the archive as either an inactive archive or the active archive.

In the preceding detailed description, embodiments of the invention are described with reference to specific exemplary embodiments thereof. Various modifications and changes may be made thereto without departing from the broader scope of the invention as set forth in the claims. The specification and drawings are, accordingly, to be regarded in an illustrative rather than a restrictive sense.

What is claimed is:

1. A method comprising:
   a) receiving a message to be logged and applying, by a processor, a filter to the received message, wherein the filter determines whether the message is to be logged;
   b) writing the message to a stream corresponding to an active archive in response to receiving the message, wherein the active archive comprises compressed messages; and
   c) writing the message to an active log without compression in response to receiving the message and determining that the message is to be logged.

2. The method of claim 1 wherein the filter excludes messages from logging based upon at least one of a physical source of the message, priority of the message, and identity of application generating the message.

3. The method of claim 1 further comprising:
   d) closing the stream if the size of the stream exceeds a pre-determined threshold, wherein the active archive becomes an inactive archive.

4. The method of claim 3 further comprising:
   e) deleting the active log.

5. The method of claim 1 wherein the active log is an uncompressed text file.

6. The method of claim 1 wherein the stream compresses messages using at least one of an entropy encoding, dictionary coding, run-length encoding, Burrows-Wheeler transform, pre-diction by partial matching, and dynamic Markov compression.

7. The method of claim 6 wherein the dictionary coding includes one of a Lempel-Ziv-Oberhumer, Lempel-Ziv 77, Lempel-Ziv 78, Lempel-Ziv-Markov, and Lempel-Ziv-Welsh coding.

8. The method of claim 6 wherein the entropy encoding includes at least one of a Huffman coding, an adaptive Huffman coding, and an arithmetic coding.

9. An apparatus comprising:
a processor; and
a nonvolatile memory, wherein upon receipt of a message to be logged the processor applies a filter to the received message, wherein the filter determines whether the message is to be logged, and wherein the processor writes the message to an uncompressed active log stored by the nonvolatile memory in response to a determination that the message is to be logged, wherein upon receipt of the message to be logged the processor writes the message to a stream corresponding to an active archive stored by the nonvolatile memory, wherein the received message is compressed within the active archive.

10. The apparatus of claim 9 wherein the filter excludes messages from logging based upon at least one of a physical source of the message, priority of the message, and identity of an application generating the message.

11. The apparatus of claim 9 wherein the processor closes the stream if the size of the stream exceeds a pre-determined threshold, wherein the active archive becomes an inactive archive.

12. The apparatus of claim 9 wherein the stream compresses messages using at least one of an entropy encoding, dictionary coding, run-length encoding, Burrows-Wheeler transform, pre-diction by partial matching, and dynamic Markov compression.

13. The apparatus of claim 12 wherein the dictionary coding includes one of a Lempel-Ziv-Oberhumer, Lempel-Ziv 77, Lempel-Ziv 78, Lempel-Ziv-Markov, and Lempel-Ziv-Welsh coding.

14. The apparatus of claim 12 wherein the entropy encoding includes at least one of a Huffman coding, an adaptive Huffman coding, and an arithmetic coding.

15. A non-transitory computer readable storage medium storing processor executable instructions wherein upon execution, the processor executable instructions instruct a processor to in response to receiving a message, apply a filter to the received message, wherein the filter determines whether the message is to be logged, write the received message to a stream corresponding to an active archive wherein the messages are compressed, and to write the received message to an active log without compression in response to a determination that the message is to be logged, wherein the active archive comprises compressed messages.

16. The non-transitory computer readable storage medium of claim 15 wherein the messages are compressed using at least one of an entropy encoding, dictionary coding, run-length encoding, Burrows-Wheeler transform, prediction by partial matching, and dynamic Markov compression.

17. The non-transitory computer readable storage medium of claim 16 wherein the dictionary coding includes one of a Lempel-Ziv-Oberhumer, Lempel-Ziv 77, Lempel-Ziv 78, Lempel-Ziv-Markov, and Lempel-Ziv-Welsh coding.

18. The non-transitory computer readable storage medium of claim 16 wherein the entropy encoding includes at least one of a Huffman coding, an adaptive Huffman coding, and an arithmetic coding.

* * * * *

UNITED STATES PATENT AND TRADEMARK OFFICE
CERTIFICATE OF CORRECTION

| | | |
|---|---|---|
| PATENT NO. | : 8,549,239 B2 | Page 1 of 1 |
| APPLICATION NO. | : 11/820806 | |
| DATED | : October 1, 2013 | |
| INVENTOR(S) | : Adrian W. Cowham et al. | |

It is certified that error appears in the above-identified patent and that said Letters Patent is hereby corrected as shown below:

In the Claims:

In column 7, line 6, in Claim 6, delete "pre-diction" and insert -- prediction --, therefor.

In column 8, line 2, in Claim 12, delete "pre-diction" and insert -- prediction --, therefor.

Signed and Sealed this
Seventh Day of January, 2014

Margaret A. Focarino
*Commissioner for Patents of the United States Patent and Trademark Office*